3,230,681
SPLINE JOINT FOR EXPANDED
THERMOPLASTIC PANELS
Garald F. Allen and Donald R. Gray, both of Midland,
Mich., assignors to The Dow Chemical Company, Midland, Mich., a corporation of Delaware
Filed July 12, 1961, Ser. No. 123,507
3 Claims. (Cl. 52—309)

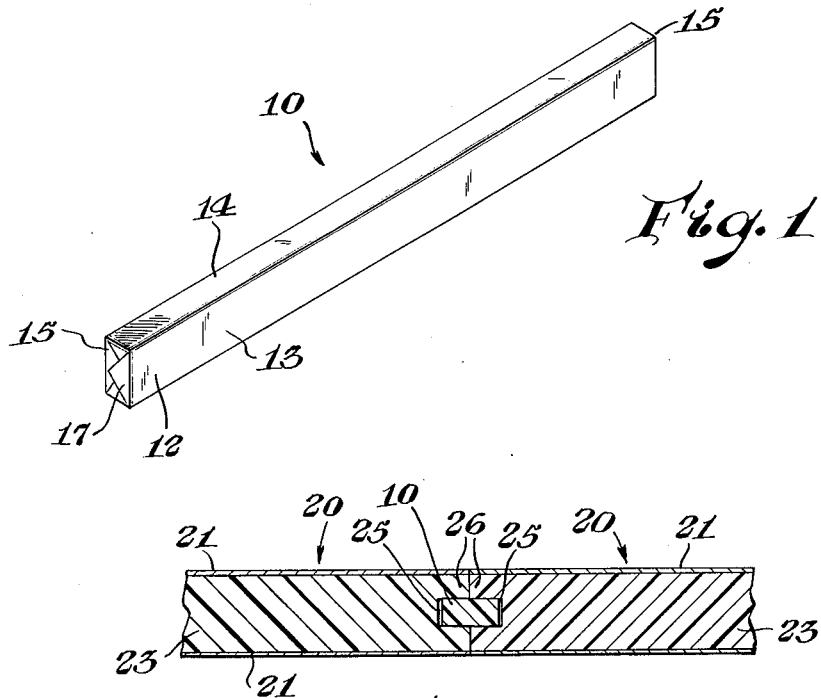
Fig. 1
Fig. 2
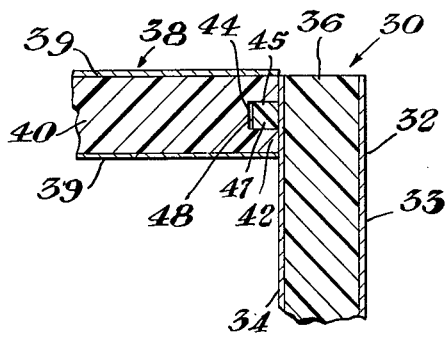
Fig. 3
INVENTORS.
Garald F. Allen
Donald R. Gray
BY Robert Bingham
AGENT 000
United States Patent Office 3,230,681
Patented Jan. 25, 1966

This invention relates to structures fabricated from laminated panels. It more particularly relates to structures fabricated from panels comprising an inner core portion of an expanded cellular plastic material and means of joining said panels together.

In present construction practices, it has been found very desirable to employ prefabricated panels comprising a sheet foam or cellular plastic material having disposed on either side of the central plastic core and adhered thereto a pair of face sheets. Typical commercial panels of this nature have an expanded cellular polystyrene core and face sheets of plywood, fibrous or filamentary glass having a resinous or cementitious binder, and the like. Such panels are particularly advantageous when employed in a fabrication of buildings or enclosure wherein an appreciable temperature gradient is maintained between the inside and outside of the enclosure. Typical of such applications are freezers, coolers, meat storage enclosures, and the like. Much difficulty has been encountered joining panels having plastic foam cores in edge to edge relationship. Most often this is done by means of batten strips, caulking, and the like. Frequently, because of the extreme temperature differences which, for example, may often be in the range of 100° Fahrenheit or even greater, vapor or thermal leakage in the joints between the adjacent panels presents a serious problem. If the interior of the enclosure is to be maintained at a low temperature, for example, —20° to —40° Fahrenheit, leakage and frost build up often occurs at the joints which detracts from the utility of the enclosure. This occurs frequently on temperature cycling wherein moisture accumulates between the joints, thaws, and is refrozen before it is removed. Such thermal leaks generally are operationally undesirable, inconvenient, and give rise to nonuniform temperature distribution in the enclosure and frequently represent a considerable economic loss.

It is an object of this invention to provide an improved means of joining the foam laminate panels in edge to edge relationship to markedly reduce thermal leakage.

It is a further object of this invention to provide an improved spline connection between panels having a foam plastic core.

It is still a further object of this invention to provide an improved spline adapted to join foam core panels.

These benefits and other advantages in accordance with the invention are achieved by employing a spline comprising an elongate plastic foam member overwrapped with a continuous layer of plastic film which is not brittle at operating temperatures.

Further features and advantages of the invention will become apparent from the following description and specification when taken in connection with the drawing wherein:

In FIGURE 1 there is illustrated an isometric view of a spline in accordance with the invention.

FIGURE 2 depicts a cross sectional view of two panels joined with a spline of FIGURE 1.

FIGURE 3 represents a half spline inserted in laminated insulating panels.

In FIGURE 1 there is illustrated a spline generally indicated by the reference numeral 10. The spline 10 comprises an inner foamed plastic body 12 having sides 13 (one shown), edges 14 (one shown), and ends 15. The foam plastic body 12 is enclosed within an overwrap of a thin plastic film 17.

FIGURE 2 depicts a cross sectional view of laminated panels 20 joined together with a spline 10. The panels 20 comprise a pair of opposed face sheets 21 attached to a foam plastic core member 23. The foam plastic core member 23 forms a pair of grooves or recesses 25 disposed at the edges 26 of the panels 20. Positioned within the grooves 25 is a spline 10.

FIGURE 3 depicts a cross sectional view of a corner 30 between two panels having foam plastic cores. The structure comprises a panel 32 having face sheets 33 and 34, and a foam plastic core 36. Positioned normally to the panel 32 is a panel 38 comprising face sheets 39 and a foam plastic core 40. An edge 42 of the core 40 has defined therein a groove 44. The groove 44 carries a half spline 45 comprising a core section 47 foam plastic material and a thin plastic film overwrap 48.

Advantageously, splines in accordance with the invention are fabricated from a wide variety of expanded plastic materials such as polystyrene, polyethylene, polyurethanes, epoxy resins, and the like. The choice of material will depend primarily upon the application and type of service required from the structure in which they are employed. Generally, for movable installations, or those which are subjected to vibration advantageously employ splines fabricated from the more flexible foams such as polyethylene and the flexible polyurethanes. In installations where there is to be expected no mechanical working of the joints, rigid foams such as those prepared from polystyrene and phenyl formaldehyde compositions are eminently suitable. Similarly, the selection of the plastic film to overwrap the surface of the spline is somewhat dependent on the particular application. For extremely low temperature applications, generally polyolefin films such as polyethylene and polypropylene are utilized as they withstand low temperatures without becoming excessively brittle, whereas for somewhat higher temperatures, such materials as polyvinyl chloride and the like are satisfactory.

A spline member in accordance with the invention may be encased in the overwrap of thermoplastic film in a variety of ways. It is found satisfactory to prepare a strip of thin film having a major dimension approximating the length of the spline and a minor dimension roughly equal to the minor circumference of the spline. The spline may then be rolled into the film and the film joined by heating sealing, adhesives and other well known joining techniques. In instances where film is available in relatively narrow widths relative to the length of the spline, in such case the spline can be enclosed in the film by helically winding the narrow film about the length of the spline allowing some overlap of adjacent coils. A helically wrapped spline is particularly advantageous where relatively tight fit is desired. This embodiment presents no weakened sealed area and insertion of the overwrapped spline into the panel grooves may be made with little probability of rupturing the film overwrap.

Beneficially, splines in accordance with the invention are fabricated to be a press fit into the grooves of the foamed plastic cores designed to receive them. A press fit permits the expanded plastic core to grip the spline with sufficient tension to prevent undesired movement during the assembly and provides a relatively firm seal between the core material and the spline. The precise tolerances for various foam materials will vary depending upon the physical properties thereof. For example, when a one inch thick polystyrene foam spline is employed with a foamed polystyrene panel core, advantageously the spline has a dimension of about 0.016 inch greater than the width of the receiving groove. However, if a spline such as may be prepared from a flexible polyethylene foam is employed, it is frequently advantageous for the spline to be about 0.06 inch wider than the receiving groove. Advantageously, an integral film skin may be incorporated on the spline by the extrusion of a member having the desired cross sectional dimension.

In a representative operation, a plurality of 4 foot by 8 foot sandwich panels were prepared having a core of expanded polystyrene having a density of about 1½ pounds per cubic foot and surfaces of ⅛ inch hardboard (commercially available as tempered Masonite sold by the Masonite Corporation). The edges of the panels were provided with a ¾ inch wide and 1 inch deep groove centrally located between the opposite faces. A plurality of splines were prepared from expanded polystyrene having a density of about 3 pounds per cubic foot. The foamed splines had a dimension of ¾ of an inch by 2 3/16 of an inch, and one-half of a spline was covered with a layer of a 1 mil thick polyethylene film. One polystyrene spline was totally covered with 1 mil polyethylene film and one polystyrene spline was employed without covering. One-half of the uncovered polystyrene spline was seated in the core groove employing a mastic composition available commercially as 30–45 Foam Seal (Benjamin Foster Company). The temperature on one side of the wall was maintained at about −40° Fahrenheit and on the other side of the wall at 110° Fahrenheit at 90 percent relative humidity. At the end of 19 days the installation was observed and it was found that the joints, where an uncovered foam plastic spline was employed, frost (solidified moisture) had built up on the cold side of the wall. Similarly, moisture deposits were observed on the portion of the joint which had been mastic treated. No indication of moisture penetration was observed in portions of the joints which employed the plastic film wrapped foam plastic splines.

In a similar manner, relatively moisture-tight and thermally tight joints are prepared in accordance with the invention employing foam plastic splines prepared from materials such as expanded polystyrene, expanded polyethylene, expanded polyurethane, expanded epoxy resins, expanded phenol formaldehyde resins, and overwrapped with thin plastic film such as are prepared from polyethylene, polypropylene, polyvinyl chloride, poly amide condensation polymers, cellulose ethers, cellulose esters, polyesters, and the like.

As is apparent from the foregoing specification, the method and manufacture of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In a structure comprising a plurality of interfitted panels having joints between adjacent panels, said panels having opposed face sheets and an expanded thermoplastic core, said joints between adjacent panels comprising a spline member inserted into a groove in adjacent cores, the improvement which comprises an expanded polystyrene spline having on its surface a thin plastic film, the film having a thickness of about 1 mil.

2. The structure of claim 1, wherein said spline is wrapped in a polyethylene film.

3. The structure of claim 2, wherein said spline comprises expanded polyethylene.

References Cited by the Examiner
UNITED STATES PATENTS

| | | | |
|---|---|---|---|
| 618,738 | 1/1899 | Sargeant | 156—304 X |
| 2,127,111 | 8/1938 | Gaenzle | 20—92 X |
| 2,482,339 | 9/1949 | Hibbard | 50—443 X |
| 2,806,812 | 9/1957 | Merz. | |
| 2,826,240 | 3/1958 | Meier. | |
| 2,961,478 | 11/1960 | Burns | 20—4 |
| 2,965,529 | 12/1960 | Bright | 156—293 |

FOREIGN PATENTS 1,072,942   3/1954   France.

EARL M. BERGERT, *Primary Examiner.*

CARL F. KRAFFT, *Examiner.*